Jan. 7, 1930. W. F. EAMES Re. 17,555
AUTOMATIC STOP ELEVATOR SYSTEM
Original Filed July 14, 1927 2 Sheets-Sheet 1
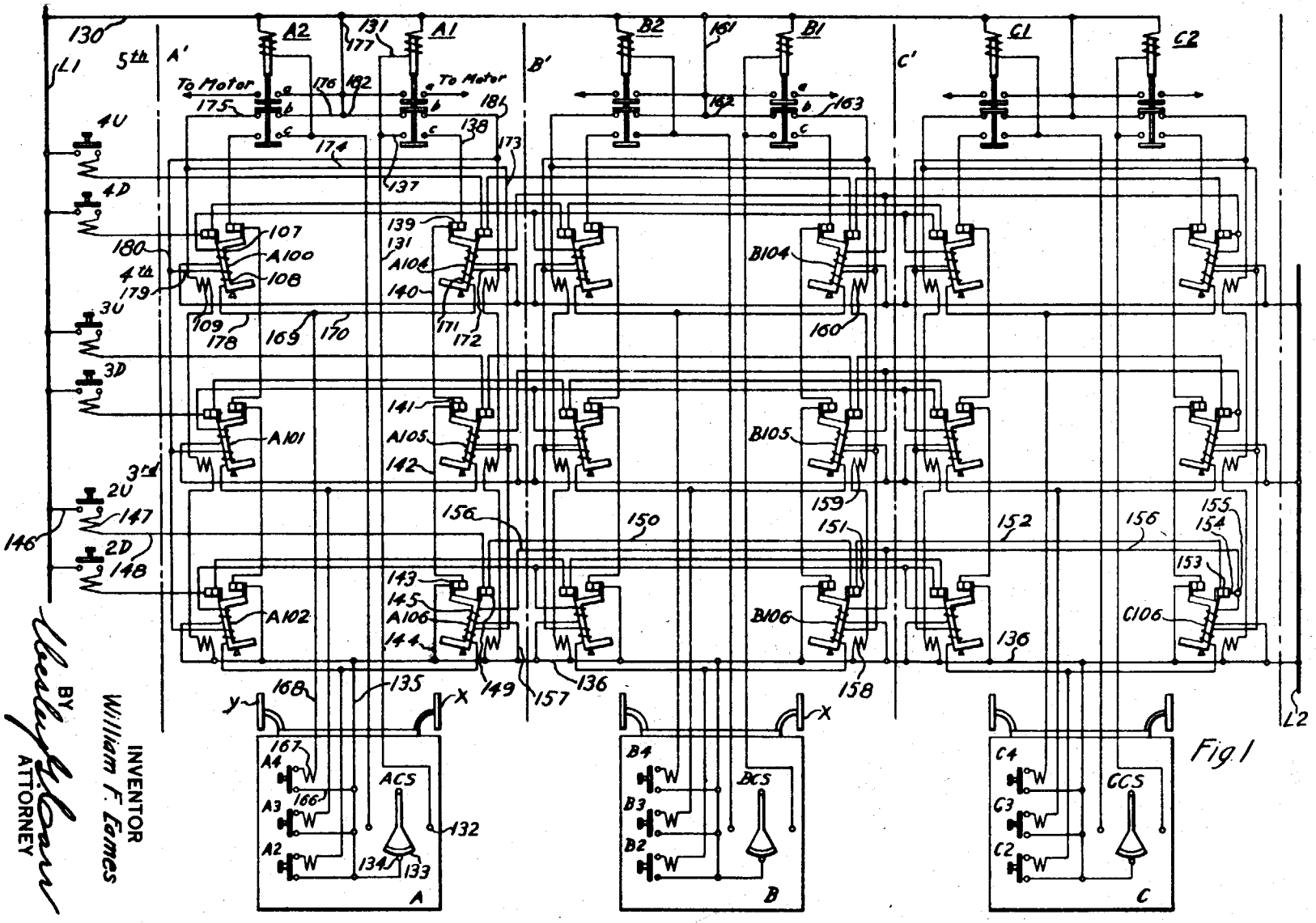

Jan. 7, 1930. W. F. EAMES Re. 17,555

AUTOMATIC STOP ELEVATOR SYSTEM

Original Filed July 14, 1927 2 Sheets-Sheet 2

INVENTOR
William F. Eames

BY Wesley G. Carr
ATTORNEY

Reissued Jan. 7, 1930 Re. 17,555

UNITED STATES PATENT OFFICE

WILLIAM F. EAMES, OF WILKINSBURG, PENNSYLVANIA, ASSIGNOR TO WESTINGHOUSE ELECTRIC & MANUFACTURING COMPANY, A CORPORATION OF PENNSYLVANIA

AUTOMATIC-STOP ELEVATOR SYSTEM

Original No. 1,715,744, dated June 4, 1929, Serial No. 205,570, filed July 14, 1927. Application for reissue filed November 30, 1929. Serial No. 410,849.

My invention relates to control systems and it has particular relation to control systems for elevators, hoists and similar apparatus.

One object of my invention is to provide a control system for machines operable over predetermined paths wherein the machines may be selectively stopped at any one of a plurality of points along the paths.

Another object of my invention is to provide a control system for elevators of the type wherein the elevator is started by an attendant on the elevator and is automatically stopped in response to the operation of passenger-actuated push-buttons, either from within the car or at the several landings traversed by the elevator.

Another object of my invention is to provide a control system for elevators of the type designated in the preceding paragraph wherein a plurality of cars in a bank are so controlled that the first car to approach a floor at which a passenger-actuated means has been operated will be stopped at that floor only when travelling in the direction corresponding to the passenger-actuated device operated.

Another object of my invention is to provide a control system for elevators wherein the car is started by an attendant on the car and is automatically stopped in response to passenger-actuated devices, and wherein no mechanical interconnection between the elevator and the hatchway is required to effect such stops.

Another object of my invention is to provide a suitable relay structure for accomplishing the result of stopping the car without mechanical connections between the car and the hatchway.

Figure 3:
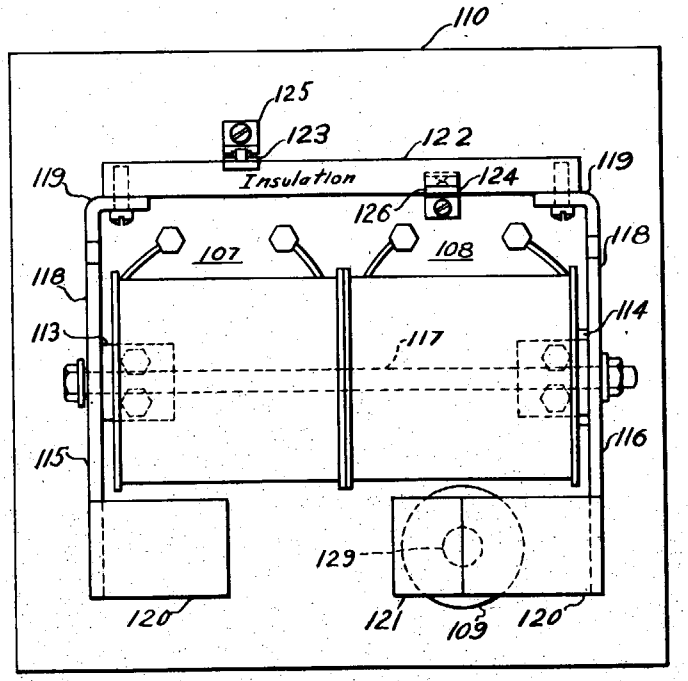
Figure 2:
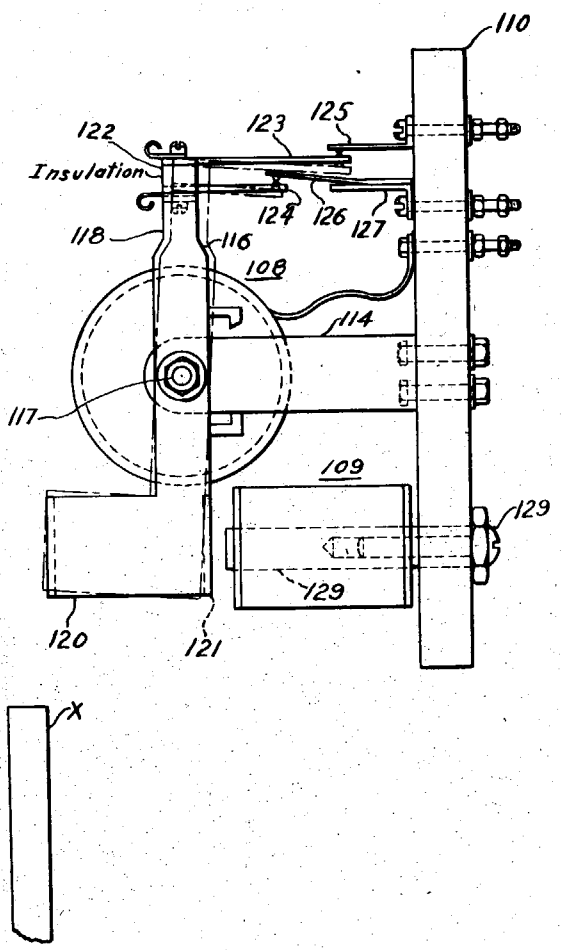

My device will be described with reference to the accompanying drawings, wherein Figure 1 is a diagrammatic view of one form of my invention as applied to three elevators operating to serve five floors;

Fig. 2 is a view, in side elevation, of a relay for use with the system shown in Fig. 1; and Fig. 3 is a plan view of the relay shown in Fig. 3.

Referring to Fig. 1, the system therein shown comprises a plurality of elevator cars A, B and C, which are controlled through the agency of car switches ACS, BCS and CCS, which, in turn, respectively govern the up-and-down direction-switches A1, A2, B1, B2, and C1, C2.

The elevator cars are illustrated as operating in hatchways defined by the broken lines A′, B′ and C′, respectively, which hatchways traverse five floors designated as 1st, 2nd, 3rd, 4th and 5th. Push-buttons 4U, 4D, 3U, 3D, 2U, and 2D are arranged respectively at the 4th, 3rd and 2nd floors for actuation by persons desiring to use the elevators.

Each of the elevator cars A, B, and C is provided with a series of push-buttons, one for each of the floors, designated respectively as A4, A3, A2, etc. It will be noted in this figure that only a single button for each of the floors is provided on the car and, as will be hereinafter explained, these buttons may be operated to stop the associated elevator car when travelling in either direction.

Inductor relays A100, A101 and A102 are illustrated as associated with the corresponding down-floor buttons 4D, 3D and 2D. A similar series of relays A104, A105 and A106 are associated with the buttons 4U, 3U and 2U. Similar inductor relays are associated with the cars B and C designated by like reference numerals preceded by the character "B" and "C", respectively.

Each of the relays A100, A101, etc., is provided with two energizing coils designated as 107 and 108, respectively, and a "hold-back" coils 109. Referring to Figs. 2 and 3, the structure of these relays may be readily determined.

Each of these relays comprises a suitable base 110 upon which coils 107 and 108 are suitably supported, as by supporting members 113 and 114. A pair of armature members 115 and 116 are rigidly mounted upon a core 117 extending through the coils 107 and 108 for unitary rotary movement in the supporting members 113 and 114. Each of the armature members comprises an upright member 118, and upper in-turned fastening portion 119 and a lower in-turned pole face 120. The member 116 also has a second turned pole face 121 for a purpose hereinafter described. The pole faces 120 and 121 extend parallel to each other in planes at right angles to the fastening member 119. Rigidly connecting the upper inturned members 119 of both of the armature members 115 and 116 is a bar 122 formed of suitable insulating material upon which may be mounted suitable contact members 123 and 124.

The contact member 123 is arranged for contacting engagement with a suitable stationary contact member 125, mounted upon the base 110. The contact member 124 is arranged for contacting engagement with a suitable contact member 126 also mounted on the base 110. The contact member 126 is preferably formed of resilient material so arranged that, upon movement of the contact members 123 and 124 to disengage their respectively cooperating contact members 125 and 126, the contact member 126 will "follow through" for a short distance, being limited by bracing member 127. The function of this arrangement is to cause disengagement of contact members 123 and 125 a short time prior to the disengagement of the contact members 124 and 126. In the preferred operation of my relay illustrated in Figs. 2 and 3, the relay is mounted in the hatchway adjacent to the path of movement of the elevator car, for example, the car A. The car A carries an inductor plate X so mounted as to approach closely adjacent to the pole face 120 of the armature members 115 and 116, as the elevator car passes the point at which the relay is mounted.

Should either of the coils 107 and 108 be energized at the time the inductor X passes the pole face 120, the magnetic force produced by the energized coil will cause the armature members 115 and 116 to assume a position indicated by the dot and dash lines in Fig. 2. This movement of the armature members will cause disengagement of the contact members 123, 125 and 124, 126.

For a purpose which will be hereinafter described, it is desirable to prevent the actuation of the armature members 115 and 116, under certain conditions, and, to provide for this effect, a suitable "hold-back" coil 109 is mounted upon the base 110. The coil 109 is provided with a suitable core 129, which extends closely adjacent to the in-turned pole face 121 on the armature member 116 when the armature member 116 is in the normal or full-line position illustrated in Fig. 2. This coil 109 is so designed that the effect produced by it, when energized, will be to prevent the actuation of the armature members 115 and 116 by the inductor plate X, even though the coil 107 or the coil 108 is energized.

Referring again to Fig. 1, the system may best be understood with reference to an assumed operation. Assuming the elevator car A to be at the first floor, the attendant on the car may acuate the handle of the car switch ACS to the left, thus energizing the up-direction switch A1 by a circuit which extends from line conductor L1 through conductors 130, the coil of up-direction switch A1, conductor 131, contact members 132, 133 and 134 of the car switch ACS, and conductors 135 and 136 to line conductor L2. The up-direction switch A1 operates to energize the driving motor (not shown) in any suitable manner, and closes a self-holding circuit which extends from line conductor L1 through conductor 130, the coil of up-direction switch A1, conductors 131 and 137, the contact members A1*c*, conductor 138, normally-closed contact members 139 of the inductor relay A104, conductor 140, normally-closed contact members 141 of inductor relay A105, conductor 142, normally-closed contact members 143 of inductor relay A106 and conductors 144 and 136 to line conductor L2. The attendant on car A may at any time thereafter, center the car switch ACS without interrupting the upward movement of the elevator car A.

Assume, for example, that a person at the second floor desires to travel upwardly and operates the button 2U at that floor. This operation will complete a circuit to energize the coil 145 of the up-inductor relay A106 for the second floor. This circuit extends from line conductor L1 through conductor 146, the push-button 2U, hold-down coil 147, conductor 148, the normally-closed contact members 149 of the inductor relay A106, conductor 150, normally-closed contact members 151 of inductor relay B106 (corresponding to the relay A106) conductor 152, the normally-closed contact members 153 of inductor relay C106, and conductor 154 to junction-point 155, whence branch circuits extend through one coil on each of the inductor relays A106, B106 and C106 to line conductor L2. The branch circuit for the relay A106 extends from junction-point 155 through conductor 156, the coil 145 of relay A106 and conductors 157 and 136 to line conductor L2. The parallel circuits for the relays B106 and C106, may readily be seen and will not, therefore, be traced.

As the car A approaches the second floor, the inductor plate X will pass the relay A106 and actuate this relay to open its contact members 143 and 149. As described with reference to Figs. 2 and 3, the contact members 143 are arranged to open just prior to the opening of contact members 149. The opening of contact members 143 opens the hold-circuit for the up-direction switch A1, and the car stops at the second floor. The opening of contact members 149 opens the circuit for the coil 145 for the relay A106 and for the corresponding coils on the relays B106 and C106, thus restoring all of these relays to their normal deenergized condition.

The attendant on car A opens the door, allows the passenger to enter the car and again starts the car upward by proper movement of the car switch ACS.

As may be readily observed from the foregoing description, any of the elevator cars A, B and C which arrive adjacent the second floor, traveling in the upward direction, will operate their respective relays A106, B106, etc. to stop the car at the second floor for the passenger who operated the button 2U. However, should one of the elevator cars A, B, and C pass the second floor traveling downward, the corresponding relay A106, B106, etc. would not be operated, by reason of the effect of the hold-back coil associated with such relay.

Assuming, for example, that the elevator car B approaches the second floor, traveling downward, prior to the arrival of car A at the second floor, traveling upward, the inductor iron X on the car B will approach closely adjacent to the energized relay B106, but the hold-back coil 158 will prevent this relay B106 from operating, as explained below.

When the elevator car B is traveling downward, the circuit for the "hold-back" coils 158, 159 and 160 for each of the up-inductor relays B106, B105 and B104, respectively, will always be closed by reason of the inclusion in this circuit of the normally-closed contact members B1*b* of the up-direction switch B1. This circuit extends from line conductor L1 through conductors 130, 161 and 162, the normally-closed contact members B1*b* of up-direction switch B1, conductor 163 and thence, in series relation, through each of the hold-back coils 160, 159 and 158, and conductor 136 to line conductor L2. In this manner, the car B will be caused to stop in response to passenger-operated push buttons at the various floors only when the car is traveling in the direction corresponding to that for which such buttons are operated.

Assuming now that the passenger entering the car A at the second floor desires to travel to the 4th floor and so informs the attendant on the car A, the attendant presses the 4th floor button A4 on the car, thus completing a circuit which extends from line conductor L2, through conductors 136, 135 and 166, the push-button A4, hold-down coil 167 for the button A4, and conductor 168 to junction-point 169, whence one branch of the circuit extends, by way of conductor 170, through the coil 171 of the relay A104, conductors 172, 173, 174 and 175, contact members A2*b* on the down-direction switch A2 and conductors 176, 177 and 130 to line conductor L1. From junction-point 169, another branch of the circuit extends by way of conductor 178 through the coil 108 of relay A100, conductors 179, 180 and 181, normally-closed contact members A1*b*, and conductors 182, 177, and 130 to line conductor L1. This branch of the circuit, however, will be opened by the operation of up-direction switch A1 as the car continues its upward travel, thus permitting only the coil 171 for up-inductor relay A104 to remain energized.

As the car approaches the 4th floor, the inductor iron X will approach the relay A104 and open contact member 139 of the relay A104, thereby deenergizing the up-direction switch A1 and stopping the elevator car A at the 4th floor. As may readily be seen from the description of the circuits for the coil 171 of relay A104 and the coil 108 of the relay A100, the same push-button A4 on the car may be used to stop the car when traveling either upwardly or downwardly, and the direction of the movement of the car will govern which of these relays is to be effective. My invention permits the use of the single car button, as hereinbefore described, and reduces the number of conductors required in the cable connecting the elevator car to the stationary control devices. Moreover, the use of the relay of the type shown in Figs. 2 and 3 permits a compact assembly of the apparatus used for each stop, yet also permits ready interconnection of several elevator cars in a bank to be made for operation from a common control means at the floors.

The apparatus disclosed is merely illustrative and may be changed in any suitable manner without modifying essentials of my invention. I do not, therefore, desire to be limited to the details shown and described except as defined in the appended claims.

I claim as my invention:

1. In a control system for elevators, a car operable past a floor, means for starting said car, call means at said floor, call means on said car, means for stopping said car at said floor comprising a relay having two actuating coils, means for energizing one of said coils responsive to the actuation of said floor-call means, means for energizing the other of said coils responsive to the actuation of said car-call means, and means operable in accordance with movements of said car for rendering said relay operable to stop said car.

2. In a control system for elevators, a car operable past a floor, means for starting said car, call means at said floor, call means on said car, means for stopping said car at said floor comprising a relay having two actuating coils, means for energizing one of said coils responsive to the actuation of said floor-call means, means for energizing the other of said coils responsive to the actuation of said car-call means, means operable in accordance with movements of said car for rendering said relay operable to stop said car, means for maintaining said call means operative when actuated, and means operable by actuation of said stopping means for restoring said call means to inoperative position.

3. In a relay for elevator-control systems, a core, an armature mounted on said core, a pair of energizable coils on said core normally ineffective to actuate said armature when energized, and means for rendering either of said coils effective to actuate said armature when either of them is energized.

4. In a relay for elevator-control systems, a core, an armature mounted on said core, a pair of energizable coils on said core normally ineffective to actuate said armature when energized, means for rendering either of said coils effective to actuate said armature when either of them is energized, and magnetic means for preventing actuation of said armature by said energized coil.

5. In a relay system for elevators, a relay, a coil therefor, means for energizing said coil, means for maintaining said coil active when energized, and means operably responsive to the operation of said relay for deenergizing said coil.

6. In a relay system for elevator control, a relay comprising a coil, an armature and a pair of switches operable by movement of said armature, means for energizing said coil, means for maintaining said coil active when energized, and means including one of said switches, operable by movement of said armature for deenergizing said coil, one of said switches comprising means for retarding the actuation of said switch.

WILLIAM F. EAMES.